United States Patent
Liao et al.

(10) Patent No.: US 9,812,899 B2
(45) Date of Patent: Nov. 7, 2017

(54) METHOD FOR AUTOMATICALLY STRENGTHENING ENERGY-SAVING AND ELECTRICAL SAFETY

(71) Applicant: CYBERPOWER SYSTEMS, INC., Taipei (TW)

(72) Inventors: Chun-Chao Liao, Taipei (TW); Chao-Ching Yang, Taipei (TW); Hsien-Hsun Liu, Taipei (TW)

(73) Assignee: Cyberpower Systems, Inc., Taipei (TW)

( * ) Notice: Subject to any disclaimer, the term of this patent is extended or adjusted under 35 U.S.C. 154(b) by 266 days.

(21) Appl. No.: 14/848,861

(22) Filed: Sep. 9, 2015

(65) Prior Publication Data

US 2016/0126786 A1 May 5, 2016

(30) Foreign Application Priority Data

Nov. 5, 2014 (TW) .............................. 103138394 A

(51) Int. Cl.
*H02J 7/00* (2006.01)
*H02J 9/06* (2006.01)
*H02J 9/00* (2006.01)

(52) U.S. Cl.
CPC .............. *H02J 9/061* (2013.01); *H02J 9/005* (2013.01); *H02J 9/062* (2013.01)

(58) Field of Classification Search
CPC .......... H02J 9/061; H02J 9/062; Y02B 70/126
See application file for complete search history.

(56) References Cited

U.S. PATENT DOCUMENTS

2014/0265595 A1\* 9/2014 Cheng ...................... H02J 9/00
307/66

\* cited by examiner

*Primary Examiner* — Sibin Chen
(74) *Attorney, Agent, or Firm* — Rosenberg, Klein & Lee

(57) ABSTRACT

A method for automatically strengthening energy-saving and electrical safety is disclosed used in a UPS system to perform auto execution of energy-saving and power usage setting. In auto execution, manual setting and auto setting are provided for selection. When entering manual setting, it is to set power environment, time or empirical parameter setting. When entering auto setting, the system will collect power environment, load status and power usage data, and then make sure of priority judgment condition, and then perform data statistic and storage, and then automatically execute Eco Mode or Normal Mode after analysis and judgment. Thus, a user can let the UPS system to collect analyzed data, and then automatically switch the operating mode according to the analysis, enhancing ease of use and lowering the use threshold.

8 Claims, 10 Drawing Sheets

METHOD FOR AUTOMATICALLY STRENGTHENING ENERGY-SAVING AND ELECTRICAL SAFETY

This application claims the priority benefit of Taiwan patent application number 103138394, filed on Nov. 5, 2014.

BACKGROUND OF THE INVENTION

1. Field of the Invention

The present invention relates to UPS (Uninterruptible Power Supply) technology and more particularly, to a method used in a UPS system for automatically strengthening energy-saving and electrical safety, which provides an auto execution function and a manual/auto parameter setting function for enabling the UPS system to switch automatically between a Normal Mode and an Eco Mode, enhancing ease of use.

2. Description of the Related Art

When using a computer, telecommunication equipment, server, processing machine, or any other electric-powered device, the user fears most is the sudden stop of the supply of power. But in practice, a long duration blackout or short duration blackout can probably occur due to an accidental interruption of power transmission line during a power company construction work, power supply equipment damage, regional power trip or unstable power supply inside the building. Therefore, we need to have a backup power supply for providing power supply for a short period application to facilitate emergency treatment. For example, computers can be shut down or the machine can complete a single manufacturing step and then be stopped.

In view of the aforesaid problem, UPS system (Uninterruptible Power Supply) was created. A UPS system contains therein a charging battery. When a power outage occurs, the system automatically switches to the charging battery to provide the necessary working power. Further, UPS systems may use an AC to DC converter, DC to AC converter, or any of a variety of other circuit modules for regulating voltage and/or current, converting AC or DC power supply, or stabilizing power supply. In operation, every circuit module can cause a certain amount of power loss. A rechargeable battery may also consume power during charging. When many circuit modules are used in a UPS system, the power loss situation will be more serious. Therefore, some UPS system providers created different switching circuits for use in their UPS systems for switching between a Normal Mode and an Eco Mode. When entering the Normal Mode, input power is transmitted through every circuit module for output, maintaining operational safety. When entering the Eco Mode, input power is directly transmitted to the load without being through the circuit modules, reducing power loss. Thus, the user can switch between the Normal Mode and the Eco Mode according to actual application status.

However, UPS systems are still not satisfactory in function. In these UPS systems, switching is achieved through a mechanical switch or by means of a computer via a control system. However, in either of the aforesaid two methods, switching must be performed manually. The personnel may need to move to a place near the UPS system so that the switching operation can be performed. If you frequently switch the system, it will spend a lot of time, resulting in use inconvenience. Further, unless a staff is specially set to handle the switching work, it is not possible to achieve mode switching at different times to meet different requirements from different people. Therefore, there is a strong demand for a measure that eliminates the aforesaid problems.

SUMMARY OF THE INVENTION

The present invention has been accomplished under the circumstances in view. It is therefore the primary object of the present invention to provide a method for use in a UPS system for automatically strengthening energy-saving and electrical safety, which enables the UPS system to automatically execute settings, wherein when entering auto execution of settings, the system allows the user to select manual parameter setting or auto parameter setting; when entering auto parameter setting, the system will collect power environment, load status and power usage data, and then make sure of priority judgment condition, and then perform data statistic and storage, and then automatically execute the Eco Mode or Normal Mode after analysis and judgment. Thus, the user needs not to frequently switch the operating mode, and the general public can get started quickly, enhancing ease of use and lowering the use threshold.

It is the secondary object of the present invention to provide a method for use in a UPS system for automatically strengthening energy-saving and electrical safety, which enables the UPS system to allow the user to select manual execution of setting or auto execution of setting, wherein when entering manual execution of setting, the system allows the user to directly select the Eco Mode or Normal Mode; when entering manual execution of setting, the system allows the user to select manual execution of parameter setting or auto execution of parameter setting. Thus, when auto execution of setting fails or direct setting is needed in case of emergency, the user can select manual execution of setting, enhancing use convenience and providing a backup measure.

It is the third object of the present invention to provide a method for use in a UPS system for automatically strengthening energy-saving and electrical safety, which, when entering the step of manually setting the parameters, is to manually set power environment parameter and data analysis cycle, so that the system can calculate and store detected power environment data within the predetermined cycle time, and then automatically execute the next Eco Mode or Normal Mode switching operation according to analysis and judgment, achieving the effects of energy-saving and electrical safety.

It is the fourth object of the present invention to provide a method for use in a UPS system for automatically strengthening energy-saving and electrical safety, which, when entering the step of manually setting the time parameter, is to set at least one of the time parameters of electrical safety time range or energy-saving time range, so that the time parameter setting can be set according to different companies, situations or places, enabling the operating mode to be automatically switched to meet different requirements for application in different companies, situations or places, enhancing use convenience and achieving energy-saving electrical safety.

It is the fifth object of the present invention to provide a method for use in a UPS system for automatically strengthening energy-saving and electrical safety, which, when entering the step of manually setting the empirical parameter, is to set at least one of the empirical parameters of users power usage time period, users work and rest time and users load status, enabling the setting to comply with individual's using habit, and achieving the effect of ease of use.

It is the sixth object of the present invention to provide a method for use in a UPS system for automatically strengthening energy-saving and electrical safety, which, when entering the step of automatically performing the Eco Mode, enables the UPS system to detect the input voltage/frequency or output voltage/frequency immediately, and then to disable the Eco Mode and to switch to the Normal Mode if the input voltage/frequency or output voltage/frequency is beyond the setting range, preventing unstable power voltage or frequency from affecting or damaging the load.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
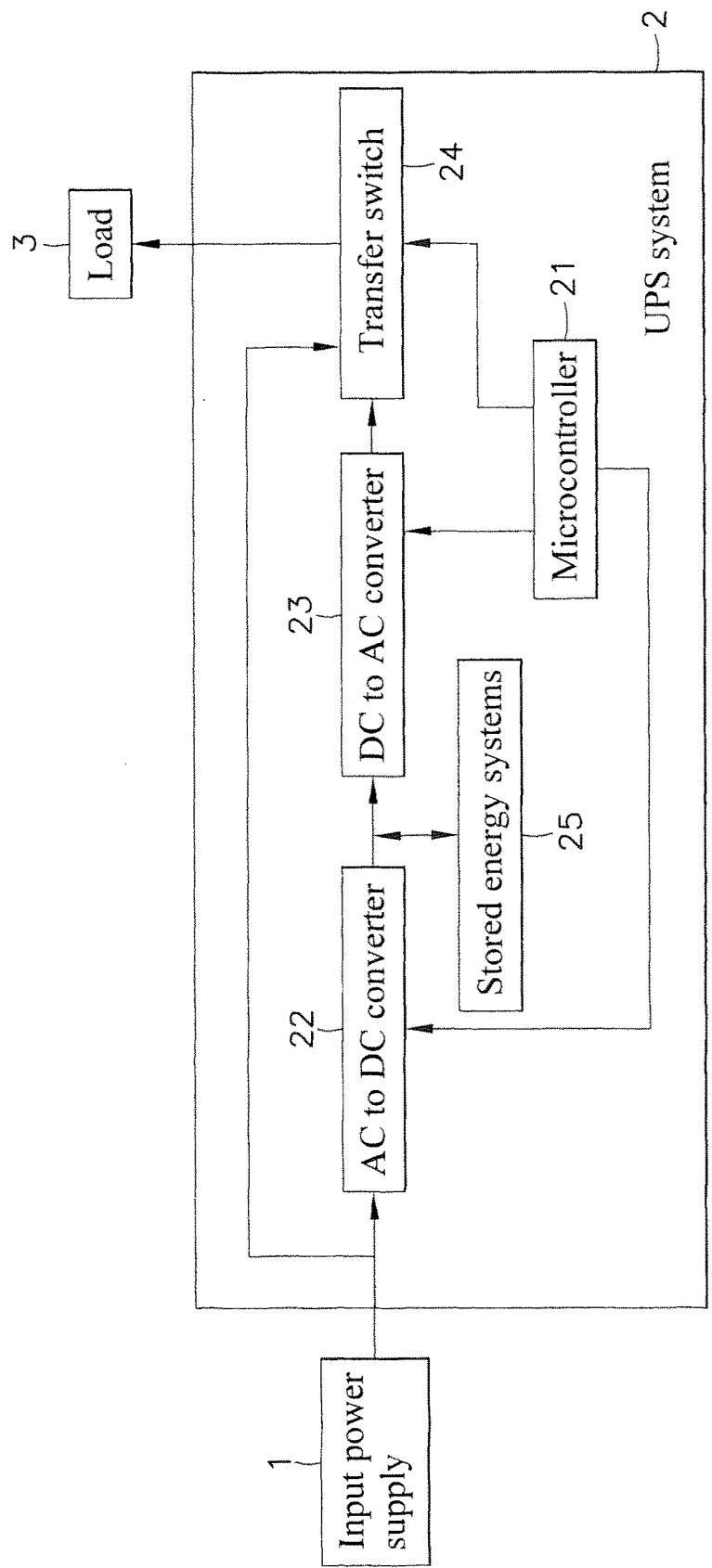
FIG. 1 is a circuit block diagram of a UPS system for the application of the method for automatically strengthening energy-saving and electrical safety in accordance with the present invention.
Figure 2:
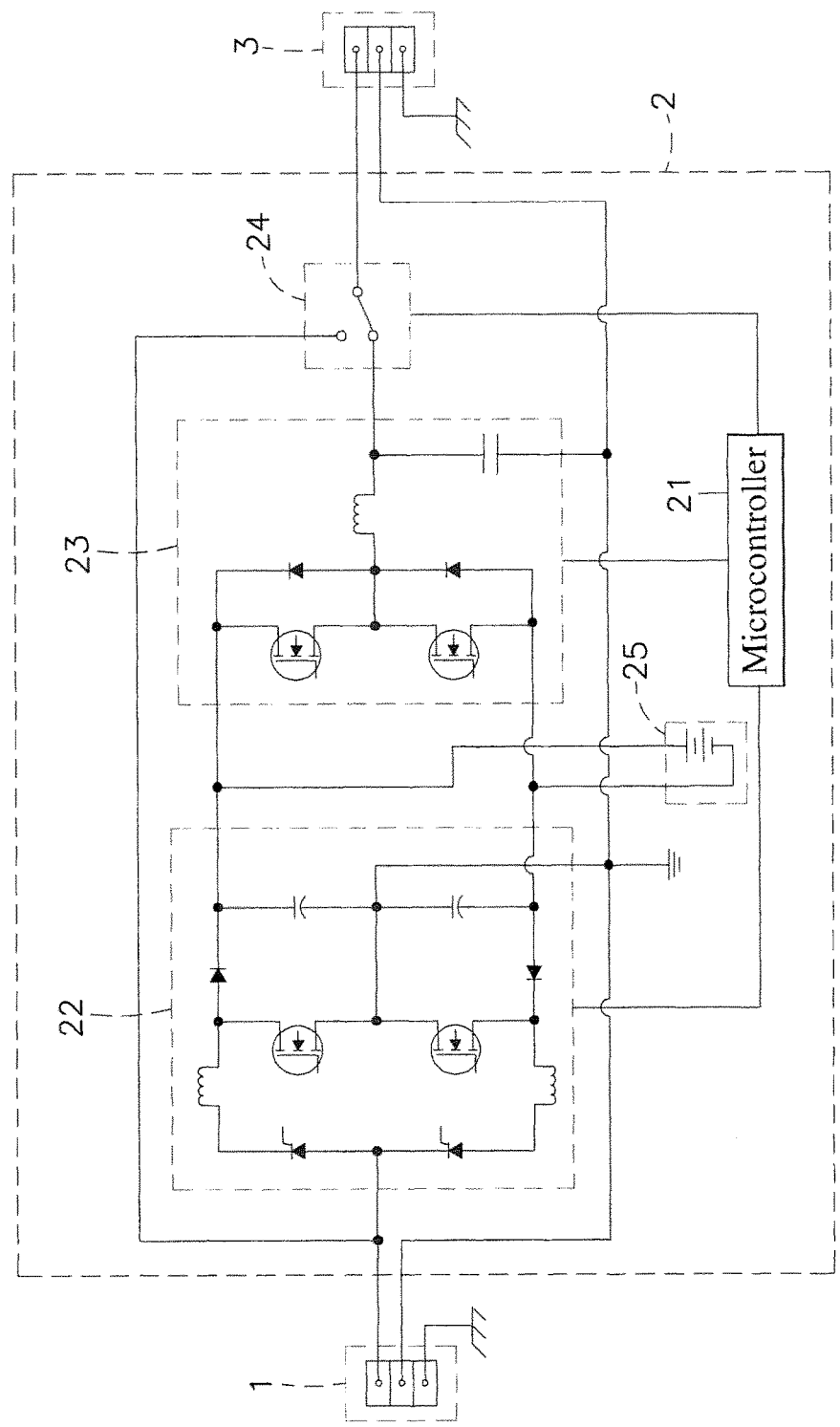
FIG. 2 is a circuit diagram of the UPS system shown in FIG. 1.

Referring to FIGS. 1 and 2, the invention provides a method used in a UPS (Uninterruptible Power Supply) system 2 for automatically strengthening energy-saving and electrical safety. The UPS system 2 is electrically connected to an input power supply 1, comprising a microcontroller 21, and an AC to DC converter 22, a DC to AC converter 23 and a transfer switch 24 respectively electrically connected to the microcontroller 21, and stored energy systems 25. The input power supply 1 is electrically connected to the AC to DC converter 22 and the transfer switch 24. The AC to DC converter 22 is electrically connected to the DC to AC converter 23. The DC to AC converter 23 is electrically connected to the transfer switch 24. The transfer switch 24 is adapted for outputting power supply to a load 3. The stored energy systems 25 is electrically connected to a midpoint between the AC to DC converter 22 and the DC to AC converter 23.

The stored energy systems 25 have a charging control circuit (not shown) connected thereto, and is electrically connected to the circuit between the AC to DC converter 22 and the DC to AC converter 23, or electrically connected in series between the AC to DC converter 22 and the DC to AC converter 23. The charging control circuit is of the known art not within the scope of the present invention, and therefore, no further description in this regard will be necessary.

The UPS system 2 is switchable through the transfer switch 24 between a Normal Mode and an Eco Mode subject to the control of the microcontroller 21. When in the Normal Mode, the input power supply 1 is transmitted through the AC to DC converter 22 and the DC to AC converter 23 to the transfer switch 24, and then transmitted from the transfer switch 24 to the load 3. When changing the operation mode, the microcontroller 21 controls the transfer switch 24 to switch from the Normal Mode to the Eco Mode, enabling the input power supply 1 to be directly transmitted to the transfer switch 24 for output to the load 3.

Figure 3:
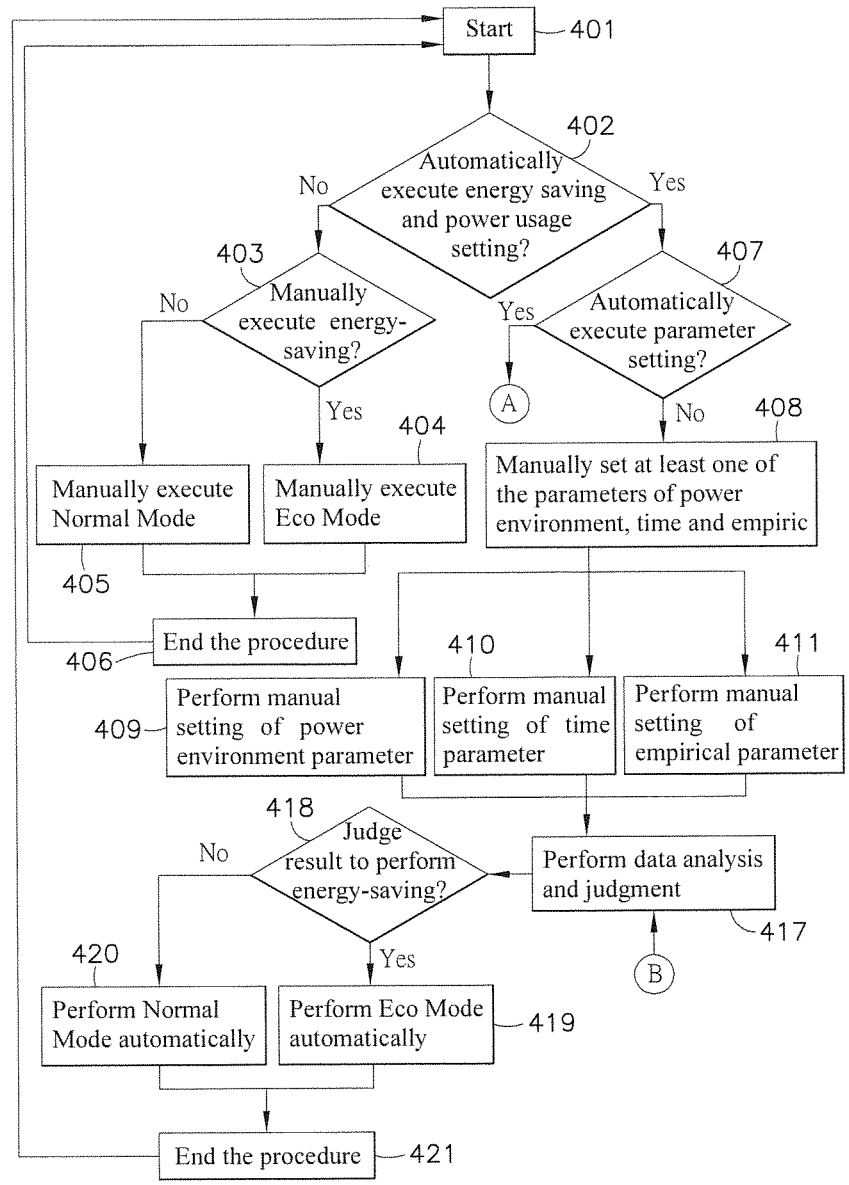
FIG. 3 is a flow chart of the method for automatically strengthening energy-saving and electrical safety in accordance with the present invention (I).
Figure 4:
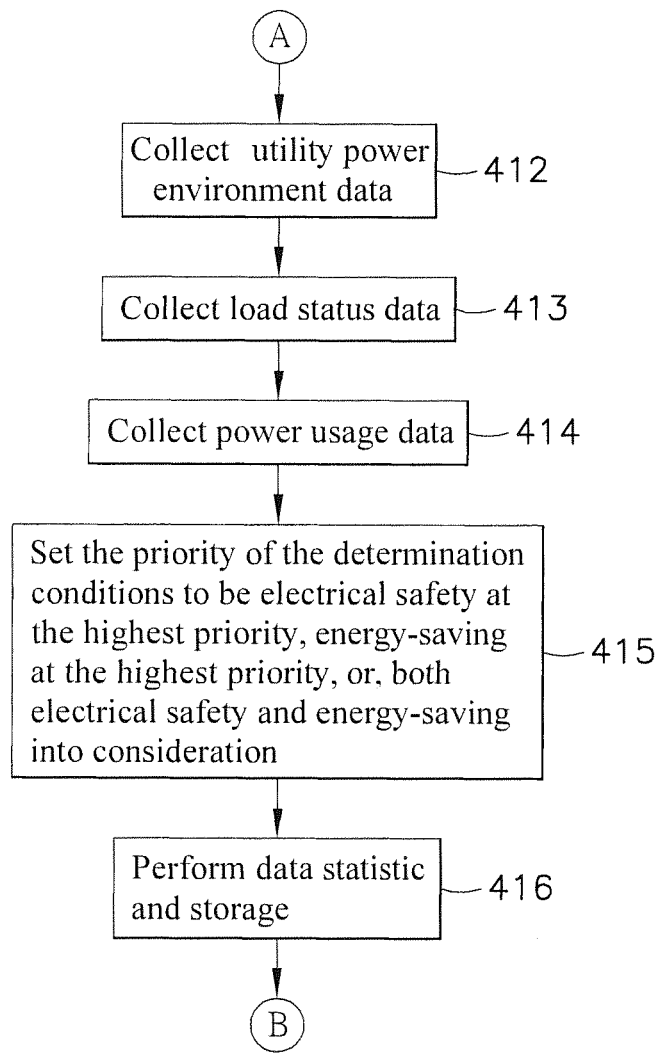
FIG. 4 is a flow chart of the method for automatically strengthening energy-saving and electrical safety in accordance with the present invention (II).

Referring to FIGS. 3 and 4 and FIGS. 1 and 2 again, the method used in the UPS system 2 for automatically strengthening energy-saving and electrical safety comprises the steps of:

(401) Start;

(402) Whether or not to automatically execute energy saving and power usage setting? And then proceed to step (403) if negative, or step (407) if positive;

(403) Whether or not to manually execute energy-saving? And then proceed to step (404) if positive, or step (405) if negative;

(404) Manually execute the Eco Mode, and then proceed to (406);

(405) Manually execute the Normal Mode, and then proceed to step (406);

(406) End the procedure, and then return to step (401);

(407) Whether or not to automatically execute parameter setting? And then proceed to step (408) if negative, or step (412) if positive;

(408) Manually set at least one of the parameters of power environment, time and empiric by: entering step (409) to set the power environment parameter, step (410) to set the time parameter and step (411) to set the empirical parameter;

(409) Perform manual setting of power environment parameter, and then proceed to step (417);

(410) Perform manual setting of time parameter, and then proceed to step (417);

(411) Perform manual setting of empirical parameter, and then proceed to step (417):

(412) Collect utility power environment data;

(413) Collect load status data;

(414) Collect power usage data;

(415) Set the priority of the determination conditions to be electrical safety at the highest priority, energy-saving at the highest priority, or, both electrical safety and energy-saving into consideration;

(416) Perform data statistic and storage;

(417) Perform data analysis and judgment;

(418) Whether or not the judgment result is to perform energy-saving ? And then proceed to step (419) if positive, or step (420) if negative;

(419) Perform the Eco Mode automatically, and then proceed to step (421);

(420) Perform the Normal Mode automatically, and then proceed to step (421);

(421) End the procedure, and then return to step (401).

In the aforesaid steps, it is to set the operation of the microcontroller 21 of the UPS system 2. At first, it is to let the user select whether or not to perform automatic setting. When performing manual setting, it is to let the user select whether or not to perform energy-saving. If energy-saving is selected, it is to enter the Eco Mode. If energy-saving is not selected, it is to enter the Normal Mode. After entered the Eco Mode or Normal Mode, the setting operation is ended.

If automatic setting is selected by the user, it is to let the user select whether or not to perform automatic parameter setting. If manual parameter setting is selected, it is to set one of the parameters of power environment, time and empiric, and then to perform data analysis and judgment. From the judgment result, it can be known whether or not to perform energy-saving. If energy-saving is desired, automatically perform the Eco Mode. If energy-saving is not desired, automatically perform the Normal Mode. After the setting operation is done, it is to return to step (401). This method allows the user to set personal parameters. In this automatic operation, data analysis and judgment is performed using the parameters manually set by the user. Thus, the system automatically switches to the Eco Mode or Normal Mode according to the parameters manually set by the user, eliminating complicated switching operation and enhancing ease of use.

If the user selects to automatically perform parameter setting, it is to collect power environment data, load status data and power usage data in a proper order, and then to determine whether or not the electrical safety or energy-saving to be at the highest priority, or, both electrical safety a nd energy-saving to be taken into consideration. The determination condition priority is set in factory. However, the user can change the setting value of the determination condition priority. Thereafter, perform data statistic and storage (the data can be directly stored in the microcontroller 21, or transmitted to an external computer and then stored therein). Thereafter, perform data analysis and judgment, and then determine whether or not to perform energy-saving according to the result of the judgment. If energy-saving is needed, perform the Eco Mode. If energy-saving is not needed, perform the Normal Mode. Thereafter, return to step (401). This method is to automatically collect power environment data, load status data and power usage data, and to use the collected data for analysis and judgment. The collected data is added with a predetermined weight ratio for calculation, and the value obtained after calculation is then matched with the predetermined value or set value of at least one of the parameters of power environment, time and empiric for judgment, and then the system is automatically switched to the Eco Mode or Normal Mode according to the result of the judgment. Because the user needs not to set the parameters, the general public can get started quickly, enhancing ease of use and lowering the use threshold.

Figure 5:
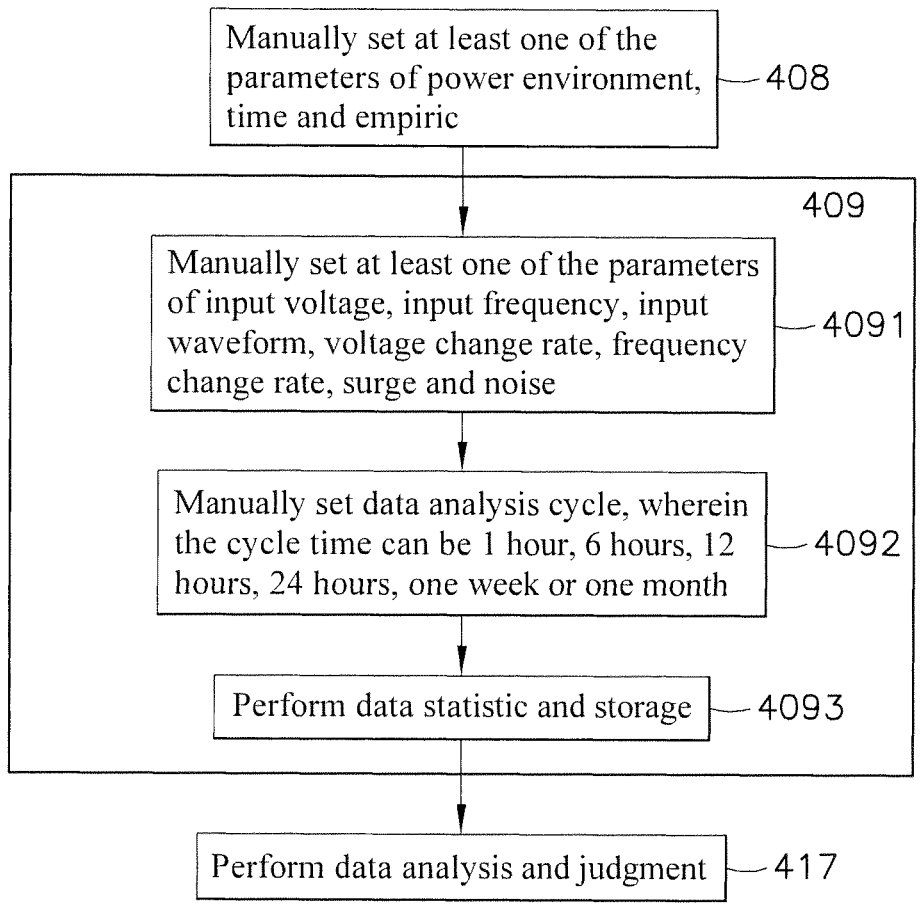
FIG. 5 is a flow chart of the manual setting of power environment parameter in accordance with the present invention.

Referring to FIG. 5 and FIGS. 1-4 again, when entering step (409) to perform manual setting of power environment parameter, the procedure comprises the sub steps of:

(4091) Manually set at least one of the parameters of input voltage, input frequency, input waveform, voltage change rate, frequency change rate, surge and noise;

(4092) Manually set the data analysis cycle, wherein the cycle time can be 1 hour, 6 hours, 12 hours, 24 hours, one week or one month;

(4093) Perform data statistic and storage, and then proceed to step (417).

Thus, when making manual setting of power environment parameter, it is to select at least one of the parameters of input voltage, input frequency, input waveform, voltage change rate, frequency change rate, surge and noise for setting, and then to set the data analysis cycle. The cycle time can be 1 hour, 6 hours, 12 hours, 24 hours, one week or one month. After setting the data analysis cycle, it is to perform data statistic and storage. The power environment parameter is the range for setting the Eco Mode or Normal Mode. The data analysis cycle is the time interval needed for analyzing and judging the detected power environment data, and thus, it can determine within the cycle time whether or not the detected power environment value exceed by the set parameter range, and then switch between the Eco Mode and the Normal Mode. If the detected power environment value didn't exceed the set parameter range, it is to switch to the Eco Mode in the predetermined cycle time. The Eco Mode saves the power loss caused by the transmission of power through the AC to DC converter 22 and the DC to AC converter 23, achieving the expected energy-saving effect. If electrical safety is taken into consideration, it is to switch to the Normal Mode, enabling power to be transmitted through the AC to DC converter 22 and the DC to AC converter 23 so that stabilized power can be provided to the load 3.

Figure 6:
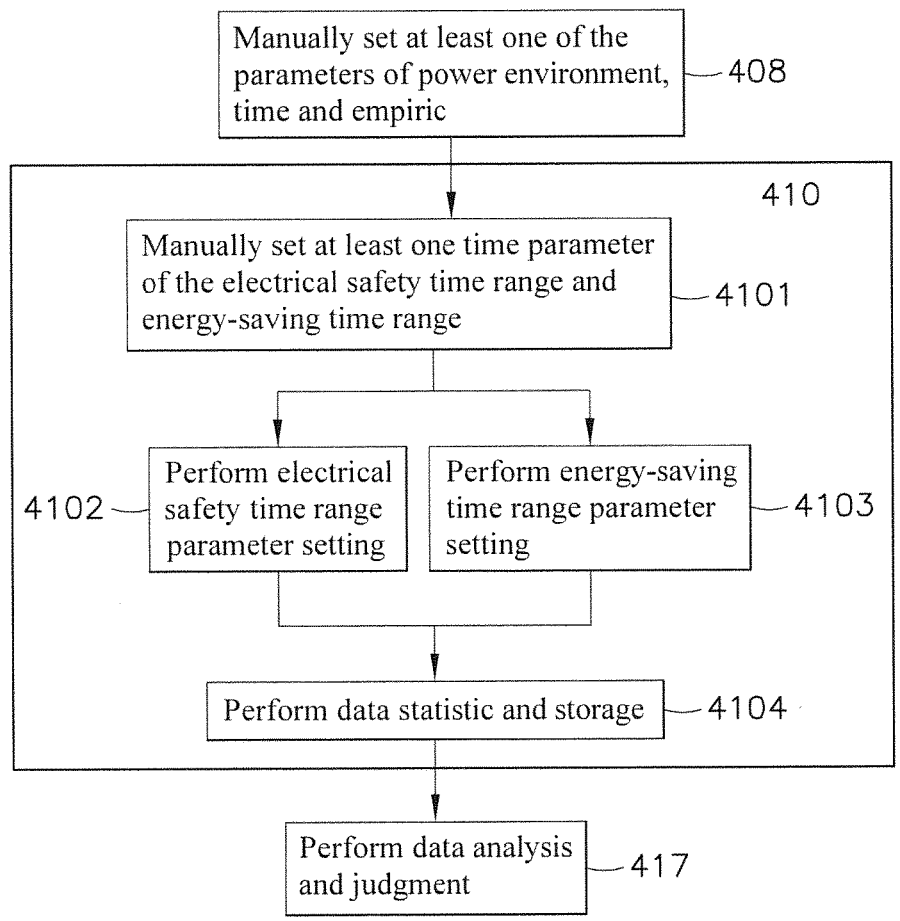
FIG. 6 is a flow chart of the manual setting of time parameter in accordance with the present invention.

Referring to FIG. 6 and FIGS. 1-4 again, when entered step (410) to perform manual setting of time parameter, the procedure comprises the sub steps of:

(4101) Manually set at least one time parameter of the electrical safety time range and energy-saving time range by: entering sub step (4102) to set the electrical safety time range, or sub step (4103) to set the energy-saving time range;

(4102) Perform electrical safety time range parameter setting, and then proceed to sub step (4104);

(4103) Perform energy-saving time range parameter setting, and then proceed to sub step (4104);

(4104) Perform data statistic and storage, and then proceed to step (417).

Thus, when making manual setting of time parameter, it is to set at least one time parameter of the electrical safety time range or energy-saving time range. The electrical safety time range allows setting of at least one predetermined time range to switch to the Normal Mode, for example, in the time range of AM9:00~12:00, or PM1:00~6:00, so as to protect the load in operation. The energy-saving time range allows setting of at least one predetermined time range to switch to the Eco Mode, for example, in the time range of PM10:00~AM8:00, or AM12:00~PM1:00. The time period in which a user extensively uses electricity will vary with different companies, situations or places. When used in a company, the time parameter setting can be made according to the company's duty hours. During the on-duty time period, multiple office equipments are working, switch to the Normal Mode. When off duty, switch to the Eco Mode. Thus, the operating mode can be automatically switched to meet different requirements for application in different companies, situations or places. Because no manual adjustment is needed, the method significantly enhances ease of use.

Figure 7:
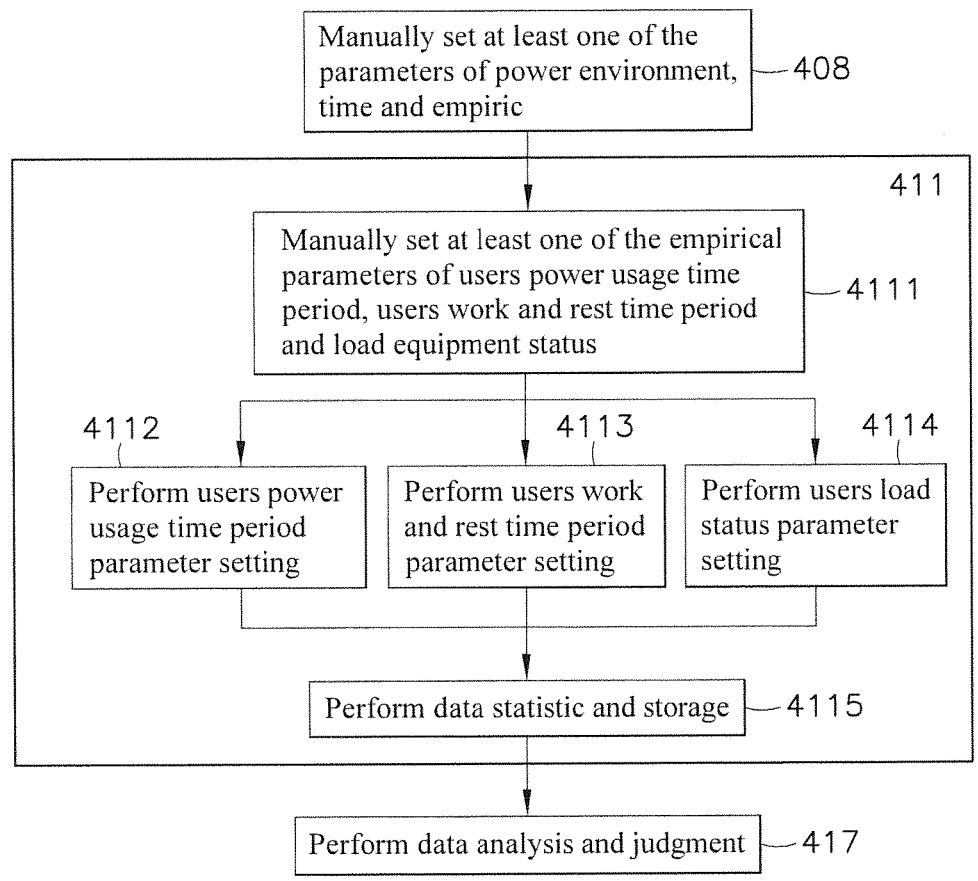
FIG. 7 is a flow chart of the manual setting of empirical parameter in accordance with the present invention.

Referring to FIG. 7 and FIGS. 1-4 again, when entering step (411) to perform manual setting of empirical parameter, the procedure comprises the sub steps of:

(4111) Manually set at least one of the empirical parameters of users power usage time period, users work and rest time period and load status by: entering sub step (4112) to set the users power usage time period, sub step (4113) to set the users work and rest time period, or sub step (4114) to set the users load status;

(4112) Perform the users power usage time period parameter setting, and then proceed to step (4115);

(4113) Perform the users work and rest time period parameter setting, and then proceed to step (4115);

(4114) Perform the users load status parameter setting, and then proceed to step (4115);

(4115) Perform data statistic and storage, and then proceed to step (417).

Thus, when making manual setting of empirical parameter, it is set at least one of the empirical parameters of users power usage time period, users work and rest time and users load status. The users power usage time period is the time period in which the user needs to use electricity, and this time period can be different from the users work and rest time period. The user may need to use electricity in a time period during the working time. The load status can be changed with different work requirements from different users, for example, the use of at least one computer, logic analyzer, projector, printer or table lamp, and thus, this method allows setting of mode to be switched to comply with individual's using habit, so that the operating mode can be switched to the Normal Mode or Eco Mode according to the set parameter when using electricity, at work or under a large load, achieving the effect of ease of use.

Figure 8:
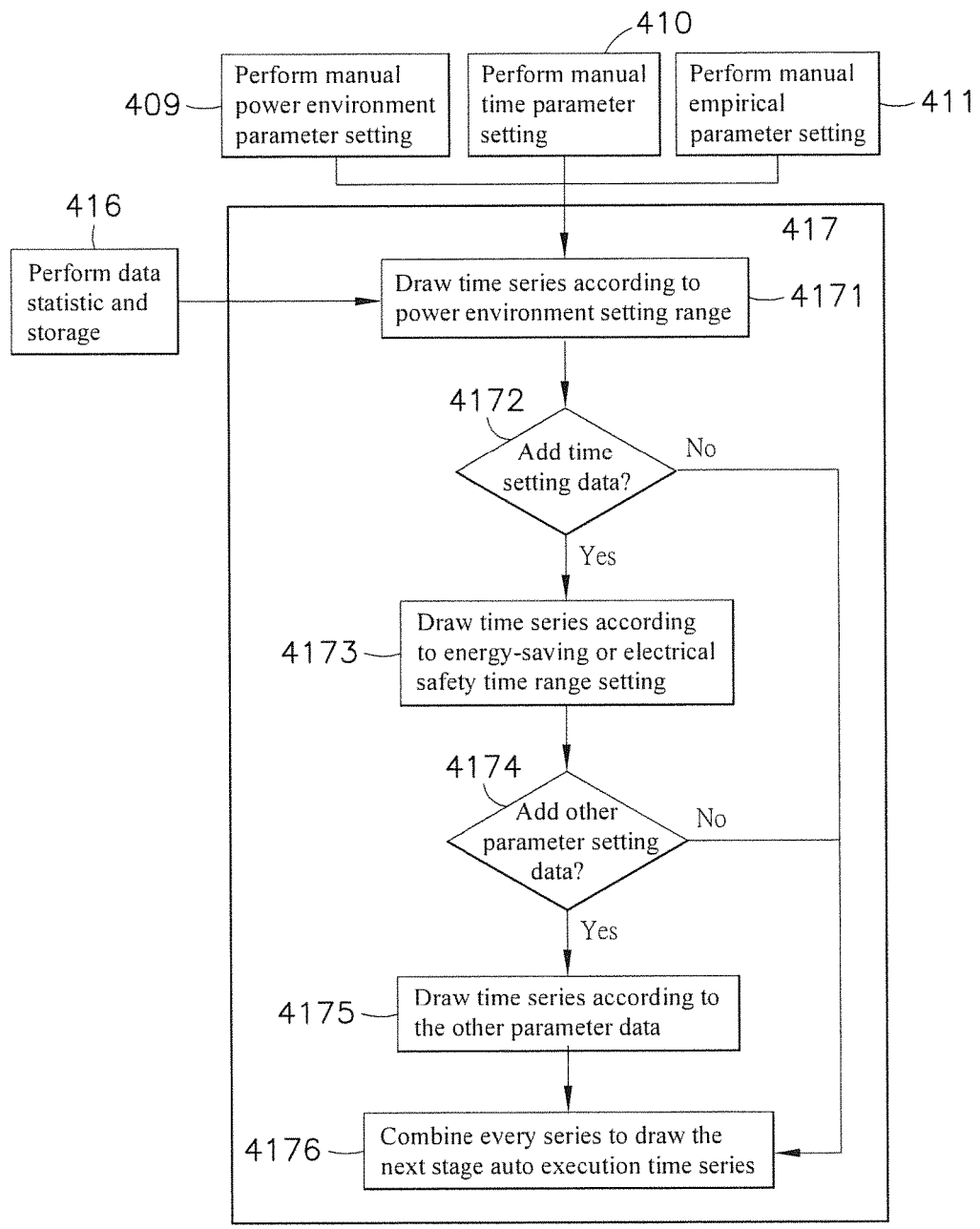
FIG. 8 is a flow chart illustrating the execution of the data analysis and judgment step in accordance with the present invention.

Referring to FIG. 8 and FIGS. 1-4 again, when entering step (417) to perform data analysis and judgment, the procedure comprises the sub steps of:

(4171) Draw the time series of the data according to the power environment setting range;

(4172) Determine whether or not to add time setting data. And then proceed to sub step (4173) if positive, or step (4176) if negative;

(4173) Draw the time series according to energy-saving or electrical safety time range setting;

(4174) Determine whether or not to add other parameter setting data. And then proceed to sub step (4175) if positive, or step (4176) if negative;

(4175) Draw the time series according to the other parameter data;

(4176) Combine every series to draw the next stage auto execution time series, and then proceed to step (418).

Thus, after manual parameter setting (Steps 409, 410 and 411) or automatic parameter setting (Step 416), draw the time series of the power environment setting range, for example, voltage setting range (such as +3V/−3V or +5V/−5V, etc.). The voltage range time series can then be directly used for drawing a next stage auto execution time series. Further, after drawing out the voltage range time series, an energy-saving time series can be drawn out according to the energy-saving or electrical safety time range parameter setting of the time parameter, and then the voltage range time series and the energy-saving time series can be combined together for drawing a next stage auto execution time series; or, after drawing of the energy-saving time series, use the other parameters (for example, the voltage change rate, input frequency of the power environment parameter or the set parameter of the load status of the empirical parameter) to draw another time series, and then combine the voltage range time series, the energy-saving time series and the said another time series for drawing a next stage auto execution time series. Thus, all automatically set parameters and the parameters manually set by the user can be combined together for drawing a next stage auto execution time series that complies with all parameters, enabling the system to switch between the Normal Mode and the Eco Mode at the predetermined time according to the next stage auto execution time series.

Figure 9:
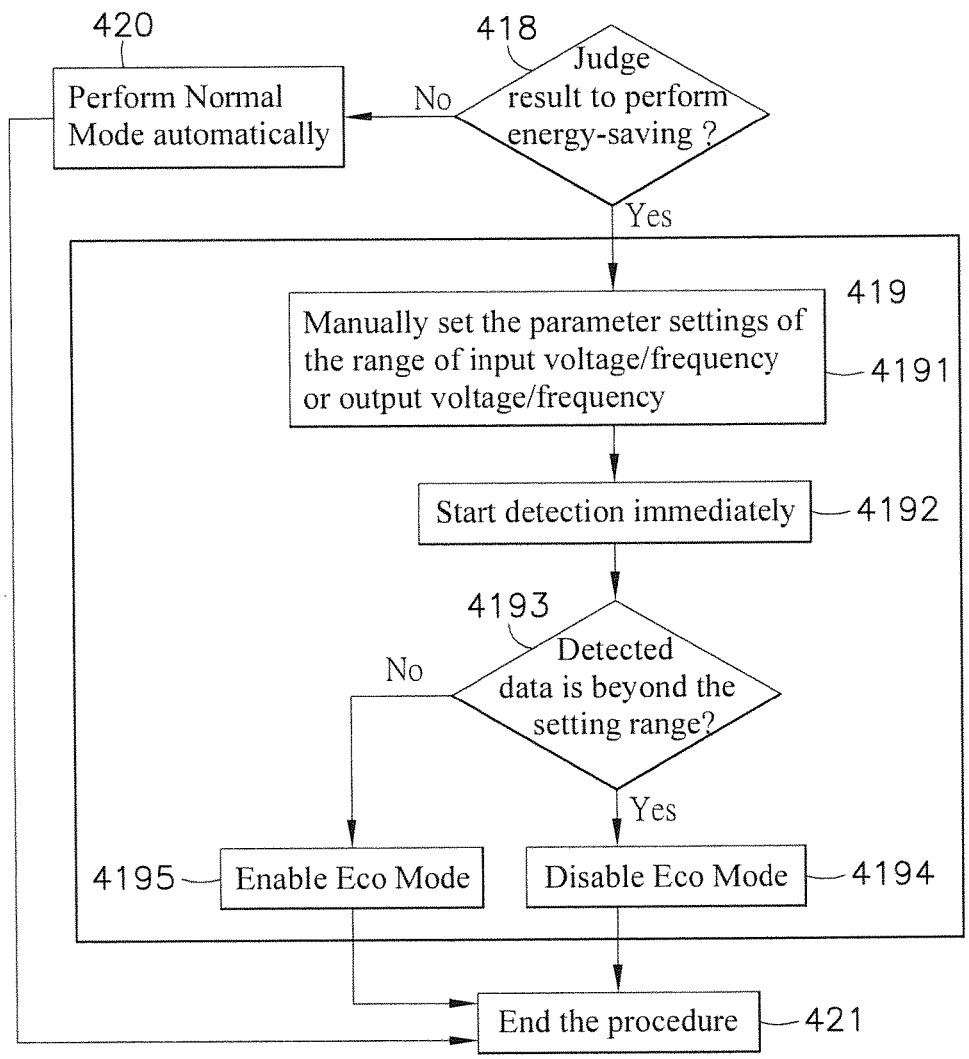
FIG. 9 is a flow chart illustrating the executing of the Eco Mode.

Referring to FIG. 9 and FIGS. 1-4 again, when entered step (419) to perform Eco Mode automatically, the procedure comprises the sub steps of:

(4191) Manually set the parameter settings of the range of the input voltage/frequency or output voltage/frequency;

(4192) Start detection immediately;

(4193) Determine whether or not it is beyond the set range. And then proceed to sub step (4195) if negative, or step (4194) if positive;

(4194) Disable Eco Mode, and then proceed to step (421);

(4195) Enable Eco Mode, and then proceed to step (421).

Thus, if the judgment result of the auto execution is to perform energy-saving and to enter the Eco Mode, manually set the input voltage/frequency or output voltage/frequency, and then immediately detect the UPS system 2 to determine whether or not the input voltage/frequency or output voltage/frequency is beyond the set range, and the proceed to sub step (4195) to run the Eco Mode if the detected data is within the set range, or disable the Eco Mode and end the procedure and then proceed to step (401) if the detected data is beyond the set value. Except the function of switching to the Normal Mode or the Eco Mode at the predetermined time, the method can repeatedly detect the UPS system 2 after switched to the Eco Mode. Further, if input voltage/frequency or output voltage/frequency is beyond the set range, the system immediately switches to the Normal Mode, preventing unstable power voltage or frequency from affecting or damaging the load 3.

Figure 10:
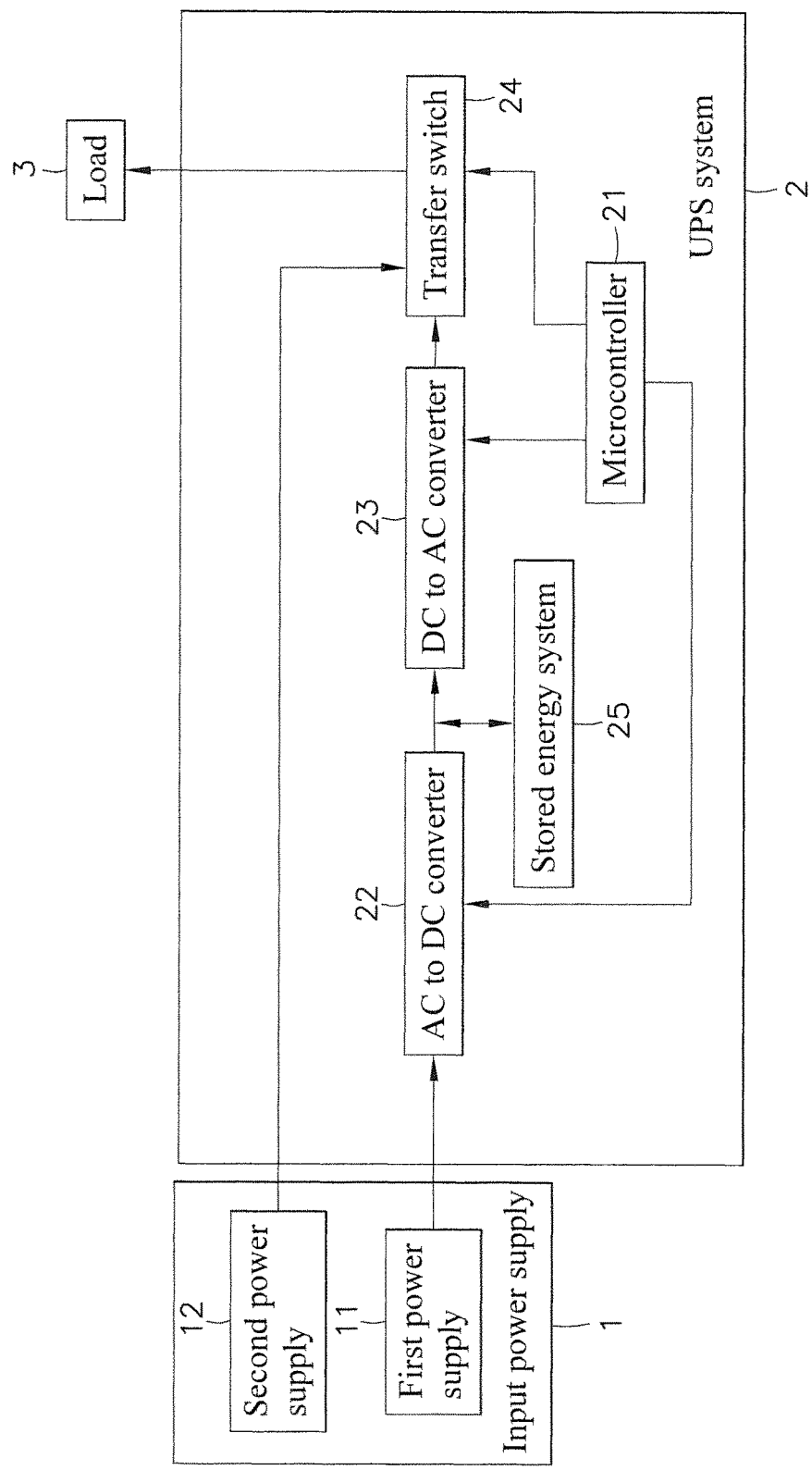
FIG. 10 is a circuit block diagram of an alternate form of the UPS system for the application of the method for automatically strengthening energy-saving and electrical safety in accordance with the present invention.

Referring to FIG. 10 and FIGS. 1 and 2 again, in an alternate form of the present invention, as shown in FIG. 10, the input power supply 1 is directly electrically connected to the AC to DC converter 22 and the transfer switch 24. Further, the input power supply 1 comprises a first power supply 11 and a second power supply 12, wherein the first power supply 11 is electrically connected to the AC to DC converter 22; the second power supply 12 is directly electrically connected to the transfer switch 24. This alternate form enables the input power supply 1 to be only connected to the AC to DC converter 22 and the transfer switch 24. However, it is to be noted that the structure, design and circuit connection of the input power supply 1 can be variously embodied using the known techniques, and therefore, no further description in this regard will be necessary.

In actual application, the method for automatically strengthening energy-saving and electrical safety in accordance with the present invention has the advantages and features as follows:

(1) The UPS system 2 can automatically execute settings. When entering auto execution of settings, the system allows the user to select manual parameter setting or auto parameter setting. When entering auto parameter setting, the system will collect power environment, load status and power usage data, and then make sure of priority judgment condition, and then perform data statistic and storage, and then automatically execute the Eco Mode or Normal Mode after analysis and judgment. Thus, the user needs not to frequently switch the operating mode, and the general public can get started quickly, enhancing ease of use and lowering the use threshold.

(II) The UPS system 2 allows the user to select manual execution of setting or auto execution of s etting. When entering manual execution of setting, the system allows the user to directly select the Eco Mode or Normal Mode. When entering auto execution of setting, the system allows the user to select manual execution of parameter setting or auto execution of parameter setting. Thus, when auto execution of setting fails or direct setting is needed in case of emergency, the user can select manual execution of setting, enhancing use convenience and providing a backup measure.

(III) When manually setting the power environment parameter setting, it is to manually set at least one of the parameters of input voltage, input frequency, input waveform, voltage change rate, frequency change rate, surge and noise, and then manually set the data analysis cycle, and then perform data statistic and storage which detected in the predetermined cycle time, and then automatically execute the next Eco Mode or Normal Mode switching operation according to analysis and judgment, achieving the effects of energy-saving and electrical safety.

(IV) When manually setting the time parameter, it is to set at least one of the time parameters of electrical safety time range or energy-saving time range, and thus, the time parameter setting can be set according to different companies, situations or places, enabling the operating mode to be automatically switched to meet different requirements for application in different companies, situations or places. Because no manual adjustment is needed, the method significantly enhances ease of use.

(V) When manually setting the empirical parameter, it is to set at least one of the empirical parameters of users power usage time period, users work and rest time and users load status, enabling the setting to comply with individual's using habit, and achieving the effect of ease of use.

(VI) When automatically performing the Eco Mode, it is to manually set the parameter settings of the range of the input voltage/frequency or output voltage/frequency, and then to let the UPS system 2 start detection, and thus, if the input voltage/frequency or output voltage/frequency is out of the set range, disable the Eco Mode and switch to the Normal Mode, preventing unstable power voltage or frequency from affecting or damaging the load 3.

In conclusion, the invention provides a method for use in a UPS system for automatically strengthening energy-saving and electrical safety, enabling the UPS system to perform auto execution of energy-saving and power usage setting. In auto execution, manual setting and auto setting are provided for selection. When entering manual setting, it is to set power environment, time or empirical parameter setting. When entering auto setting, it is to collect power environment, load status and power usage data, and then to make sure of priority judgment condition, and then to perform data statistic and storage, and then to automatically execute energy-saving or Normal Mode after analysis and judgment. Because the user can set parameters, the UPS system can automatically switch the operating mode according to the set parameters. Further, the UPS system can collect and analyze data, and automatically switch the operating mode according to the analysis, meeting different requirements, enhancing ease of use and lowering the use threshold.

Although particular embodiment of the invention have been described in detail for purposes of illustration, various modifications and enhancements may be made without departing from the spirit and scope of the invention. Accordingly, the invention is not to be limited except as by the appended claims.

What the invention claimed is:

1. A method used in a UPS (Uninterruptible Power Supply) system for automatically strengthening energy-saving and electrical safety, said UPS system being electrically connected to an input power supply, said UPS system comprising a microcontroller, an AC to DC converter, a DC to AC converter, a transfer switch and stored energy systems, said AC to DC converter, said DC to AC converter and said transfer switch being respectively electrically connected to said microcontroller, said input power supply being electrically connected to said AC to DC converter and said transfer switch, said AC to DC converter being electrically connected to said DC to AC converter, said DC to AC converter being electrically connected to said transfer switch, said transfer switch being adapted for outputting power supply to a load, said stored energy systems electrically connected to the circuit between said AC to DC converter and said DC to AC converter, said transfer switch being controllable by said microcontroller to switch said UPS system between a Normal Mode where said input power supply is transmitted through said AC to DC converter and said DC to AC converter to said transfer switch for outputting power to said load and an Eco Mode where said input power supply is directly transmitted to said transfer switch for outputting power to said load, the method comprising the steps of:

(A01) start;
(A02) determining whether or not to automatically execute energy parameter setting, and then proceeding to step (A03) if negative, or step (A07) if positive;
(A03) manually setting at least one of the parameters of power environment, time and empiric by: entering step (A04) to set the power environment parameter, step (A05) to set the time parameter and step (A06) to set the empirical parameter;
(A04) performing power environment parameter setting, and then proceeding to step (A12);
(A05) performing time parameter setting, and then proceeding to step (A12);
(A06) performing empirical parameter setting, and then proceeding to step (A12);
(A07) collecting power environment data;
(A08) collecting load status data;
(A09) collecting power usage data;
(A10) setting the priority of the determination conditions to be electrical safety at the highest priority, energy-saving at the highest priority, or, both electrical safety and energy-saving into consideration;
(A11) performing data statistic and storage;
(412) performing data analysis and judgment;
(A13) judging whether or not to perform energy-saving, and then proceeding to step (A14) if positive, or step (A15) is negative;
(A14) automatically performing the Eco Mode, and then proceeding to step (A16);
(A15) automatically performing the Normal Mode, and then proceeding to step (A16);
(A16) ending the procedure, and then returning to step (A01).

2. The method for automatically strengthening energy-saving and electrical safety as claimed in claim 1, further comprising, after step (A01) and before step (A02), the sub steps of:

(A011) determining whether or not to perform automatic energy saving and power usage setting, and then proceeding to sub step (A012) if negative, or step (A02) if positive;
(A012) determining whether or not to manually execute power saving, and then proceeding to sub step (A013) if positive, or sub step (A014) if negative;
(A013) manually executing the Eco Mode, and then proceeding to sub step (A015);
(A014) manually executing the Normal Mode, and then proceeding to sub step (A015);
(A015) ending the procedure, and then returning to step (A01).

3. The method for automatically strengthening energy-saving and electrical safety as claimed in claim 1, wherein step (A04) for performing power environment parameter setting comprising the sub steps of:

(A041) manually setting at least one of the parameters of input voltage, input frequency, input waveform, voltage change rate, frequency change rate, surge and noise;

(A042) manually setting a data analysis cycle having a cycle time of 1 hour, 6 hours, 12 hours, 24 hours, one week or one month;

(A043) performing data statistic and storage, and then proceeding to step (A12).

4. The method for automatically strengthening energy-saving and electrical safety as claimed in claim 1, wherein step (A05) for manually performing time parameter setting comprising the sub steps of:

(A051) manually setting at least one time parameter of the electrical safety time range or energy-saving time range by proceeding to sub step (A052) to set the time parameter of the electrical safety time range, or sub step (A053) to set the time parameter of the energy-saving time range;

(A052) performing electrical safety time range parameter setting, and then proceeding to sub step (A054);

(A053) performing energy-saving time range parameter setting, and then proceeding to sub step (A054);

(A054) performing data statistic and storage, and then proceeding to step (A12).

5. The method for automatically strengthening energy-saving and electrical safety as claimed in claim 1, wherein step (A06) for manually performing empirical parameter setting comprising the sub steps of:

(A061) manually setting at least one of the empirical parameters of users power usage time period, work and rest time and load status by proceeding to sub step (A062) to set the empirical parameter of users power usage time period, sub step (A063) to set the empirical parameter of users work and rest time, or sub step (A064) to set the empirical parameter of users load status;

(A062) users power usage time period parameter setting, and then proceeding to sub step (A065);

(A063) performing users work and rest time parameter setting, and then proceeding to sub step (A065);

(A064) performing users load status parameter setting, and then proceeding to sub step (A065);

(A065) performing data statistic and storage, and then proceeding to step (A12).

6. The method for automatically strengthening energy-saving and electrical safety as claimed in claim 1, wherein step (A12) for performing data analysis and judgment comprising the sub steps of:

(A121) drawing a time series according to the data of the power environment setting range;

(A122) determining whether or not to add time setting data, and then proceeding to sub step (A123) if positive, or sub step (A126) if negative;

(A123) drawing a time series according to the energy-saving or electrical safety time range;

(A124) determining whether or not to add other parameter setting data, and then proceeding to sub step (A125) if positive, or sub step (A126) if negative;

(A125) drawing a time series according to the other parameter data;

(A126) combining all the time series to draw a next stage auto execution time series, and then proceeding to step (A13).

7. The method for automatically strengthening energy-saving and electrical safety as claimed in claim 1, wherein step (A14) for automatically performing the Eco Mode comprising the sub steps of:

(A141) manually performing the parameter setting of the range of input voltage/frequency or output voltage/frequency;

(A142) starting real time detection;

(A143) determining whether or not the detected data is out of the setting range, and then proceeding to sub step (A145) if negative, or sub step (A144) if positive;

(A144) disabling the Eco Mode, and then proceeding to step (A16);

(A145) enabling the Eco Mode, and then proceeding to step (421).

8. The method for automatically strengthening energy-saving and electrical safety as claimed in claim 1, wherein said UPS system further comprises stored energy systems electrically connected to a midpoint between said AC to DC converter and said DC to AC converter.

* * * * *